UNITED STATES PATENT OFFICE 2,567,721

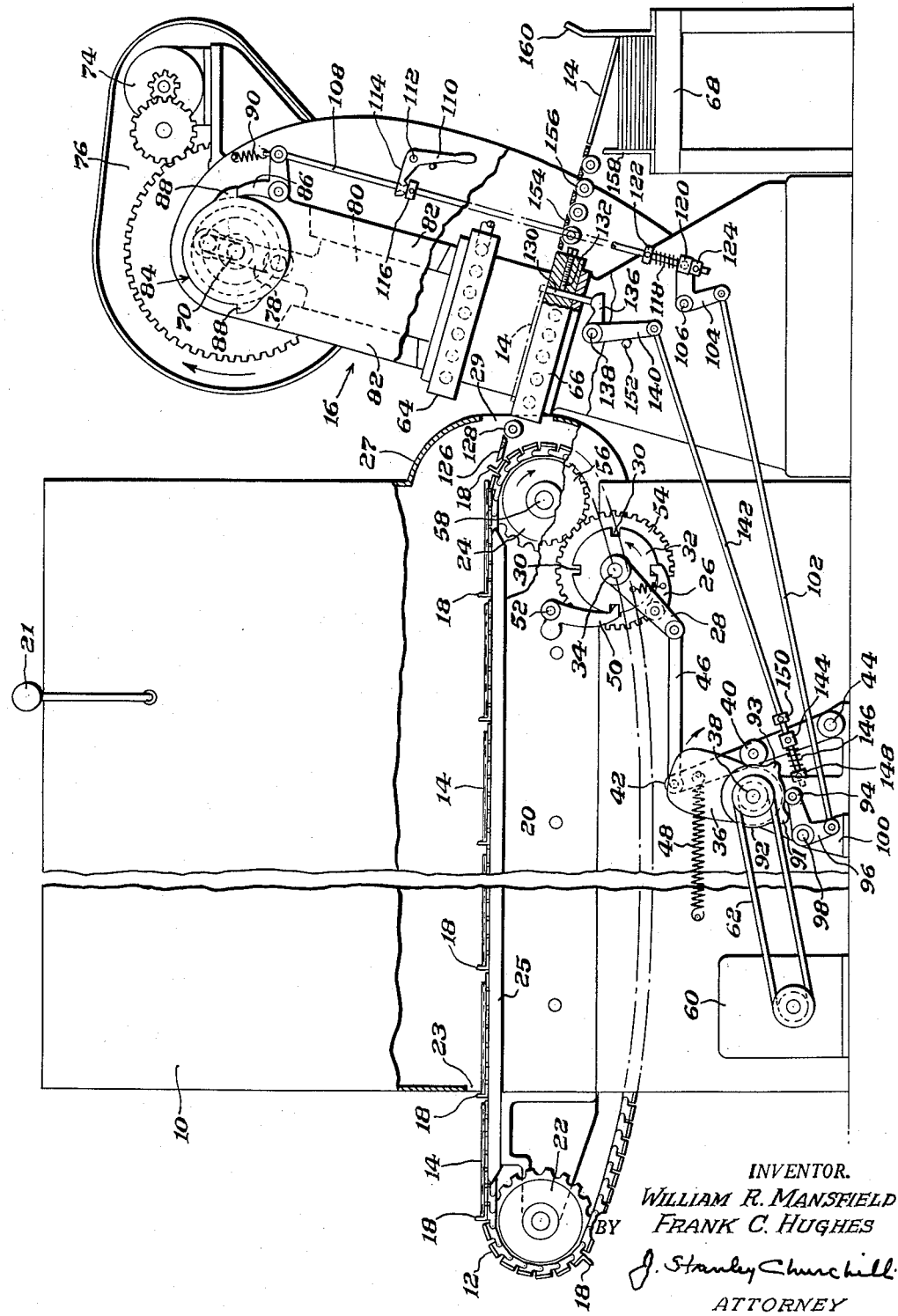

METHOD OF AND APPARATUS FOR MAKING HIGH-TEMPERATURE-RESISTING BONDED MICA PRODUCTS

William R. Mansfield, Belmont, and Frank C. Hughes, Cambridge, Mass., assignors to Willis A. Boughton, Chester L. Dawes, William R. Mansfield, Frank C. Hughes, and Donald M. Hill, trustees Application January 7, 1947, Serial No. 720,598

3 Claims. (Cl. 154—2.6)

This invention relates to a method of and apparatus for making high temperature-resisting bonded mica products.

The invention has for an object to provide a novel and superior method of and apparatus for making high temperature-resisting mica products, such as mica plate, by which a product of greater hardness, mechanical integration and uniformity, and a higher degree of translucency than heretofore available may be produced.

With these general objects in view, and such others as may hereinafter appear, the invention consists in the method of and apparatus for making a bonded mica product, hereinafter described and particularly defined in the claims at the end of this specification.

The drawing illustrates in side elevation, and partly in cross section, a preferred form of apparatus for practising the present invention.

In general, the present invention contemplates a method of and apparatus for making a high heat composite inorganic bonded mica product and more specifically a bonded mica plate wherein a mica plate is built up from mica films utilizing a high temperature-resisting inorganic binder for adhering successive layers of the mica films. The plate thus produced is then heated individually to a relatively high temperature to flux the inorganic binder, and thereafter the heated plate is subjected to compression while the binder is in a molten condition and permitted to cool under compression. The invention further contemplates the compression of the plate individually so as to insure the substantially uniform dissipation of heat from the different parts of the plate during cooling, thereby to minimize differentials in contraction between the various parts of the plate during cooling. In this manner various defects in mechanical strength, integration, translucency and uniformity of flow of the binder, which have at times heretofore been experienced in the manufacture of high temperature bonded mica plate made according to prior methods, are reduced to a minimum and a superior product may be produced.

In accordance with the preferred method of making a high temperature bonded mica plate, a layer of mica films is produced by layering the films on a screen and covering them with a layer of sprinkled, sprayed or painted inorganic binder liquid in controlled quantities. Additional layers of mica films are added with binder liquid between until the plate is built up to almost one-half the desired thickness. The full half thickness is obtained by layering on with binder liquid one or more layers of mica films. The other half of the plate is built similarly on another screen, one of the halves is then inverted and the other half is lifted and placed on the inverted half with an application of binder liquid between. The completely built green plate is then placed on another screen and is then dehydrated by heating to a suitable temperature and under such conditions as substantially to remove the solvent from the binder. The method thus far described comprises that disclosed in the United States Patent to Boughton and Mansfield No. 2,186,954, dated January 16, 1940, to which reference may be made.

The inorganic binder for the mica plate may comprise any of the known operative inorganic compounds or mixtures of such compounds, or other inorganic material, which are capable of efficient use as binders for high temperature-resisting mica plate such for example as the mixtures of monosodium phosphate and borax described by Boughton and Mansfield in Patent No. 2,186,954.

If desired, the plate may be produced in accordance with the disclosure in the United States Patent to Mansfield and Hughes, No. 2,341,637, issued February 15, 1944, wherein the mica plate may be built up in a plurality of sections and the sections assembled in such a manner that two of the sections form the outer sections of the composite plate with the lower surfaces of such two sections forming the outer surfaces of the completed plate, all as more completely set forth in said patent.

The specific distinguishing feature of this invention is that after the green plate has been produced in accordance with either of the procedures above described, the next step in the process contemplates the heating of the plate individually to a temperature sufficient to flux the inorganic binder, and then the cooling of the thus heated plate under conditions and in such a manner as to insure the substantially uniform dissipation of the heat from all of the different parts of the plate, thus eliminating or at least minimizing differentials in contraction and the defects in the plate above referred to which have accompanied to a substantial degree the production of the plate by prior methods.

In the preferred form of the apparatus for practising the present invention the green mica plates are placed individually and in spaced relation on an intermittently operated conveyer or traveling grate arranged to pass through a heating furnace. During their passage through the furnace the plates are heated to a temperature sufficient to bring the inorganic binder to a state of flux. In usual commercial practise this may be at substantially red heat. Successive heated plates are then transferred from the traveling grate directly into a power press operated in timed relation to the intermittently operated conveyer. The press is arranged to apply substantial pressure to the plate before any substantial cooling has occurred and while the binder is still in a state of flux. Preferably a pressure of at least 250 lbs. per square inch is maintained during the cooling of the plate. In this manner the dissipation of the heat from the plate is caused to take place substantially uniformly over the entire surfaces of the plate so that minimum differentials in contraction are experienced between the various parts of the plate, and a finished product is produced from which defects in uniformity, hardness, mechanical integration and translucency are eliminated, thus providing a more commercially saleable and useful product.

Referring now to the drawing, the illustrated apparatus for practising the above described method comprises, in general, an elongated heating furnace 10; an intermittently operated conveyer or traveling grate 12 upon which the individual green mica plates 14 are placed in spaced relation and which is arranged to pass through the furnace to heat the plates to the required temperature during their progress therethrough; and a power press 16 operated in timed relation to the intermittently operated traveling grate and to which the individual heated plates are successively transferred to be separately compressed and cooled.

As herein illustrated, the traveling grate 12 may comprise a chain link belt or other suitable transfer medium of any usual or preferred construction capable of withstanding the high temperatures in passing through the furnace. The traveling grate is provided with a plurality of equally spaced pusher bars 18 arranged to engage and advance the individual plates 14 during the intermittent movement of the grate over the hearth 20 of the heating furnace. The endless grate is arranged to run over an idler sprocket 22 disposed at the receiving end of the furnace, and a driven sprocket 24 disposed at the delivery end thereof, the upper run of the grate being supported by side rails 25.

The furnace 10 may be of any usual or preferred type either electric, gas fired or oil fired and provided with control mechanism including a temperature control device 21 of any usual or preferred type for maintaining a substantially constant and required temperature. The conveyer or grate 12 extends outwardly beyond the receiving end of the furnace in order to permit a green mica plate to be placed on the conveyer in front of each pusher bar 18, the upper run of the conveyer passing through a suitable opening 23 formed in the end wall at the receiving end of the furnace. The delivery end of the furnace is preferably provided with a hooded portion 27 in order to prevent any substantial cooling of the plate during the transfer operation, the hood being provided with an opening 29 through which the plates are discharged to be received by the press. The chain link belt may be of open or skeletonized structure, or may include a screen belt so that minimum obstruction between the hearth 20 and the plates is provided to enable the plates to be brought up to the required temperature in a minimum time.

As herein shown, provision is made for intermittently operating the traveling grate to effect transfer of a mica plate 14 directly from the furnace into the power press during each cycle of operation of the apparatus. The intermittently operating mechanism includes a spring-pressed pawl 26 carried by a rocker arm 28 and which is arranged to cooperate with successive equally spaced notches 30 formed in the periphery of a ratchet disc 32 mounted on a shaft 34. The rocker arm 28 is pivotally carried on the shaft 34 and is arranged to be rocked through 90° to effect ¼ of a revolution of the ratchet disc each cycle of operation, by a cam 36 fast on a cam shaft 38 and through connections including a cooperating cam roller 40 carried by a lever 42 pivotally mounted at 44. A link 46 connects the end of the lever 42 to the rocker arm 28. A spring 48 may be connected to the lever 42 to hold the roller 40 against its cam. A second pawl 50 pivotally mounted at 52 may be provided for cooperation with a notch 30 of the ratchet disc 32 at the end of each advancing stroke in order to prevent back lash and to hold the disc in its advanced position during the return stroke of the driving pawl 26. In order to drive the traveling grate a distance equal to the space between successive pusher bars 18 during each cycle of operation, the ratchet disc 32 may be formed integrally with a spur gear 54 which is arranged to mesh with a spur gear 56 fast on the driving sprocket shaft 58, the gears being designed in a suitable ratio to effect the desired movement. The cam shaft 38 may be driven through any usual or preferred driving means, herein shown as comprising a reduction gear power unit 60 connected to the cam shaft by a belt drive 62.

From the description thus far it will be observed that the individual mica plates 14 placed on the receiving end of the traveling grate 12 are intermittently advanced through the furnace 10 during which time the plates are subjected to a high heat for a sufficient length of time to bring the inorganic binder into a state of flux, and that a heated plate is discharged from the delivery end of the furnace each cycle of operation of the apparatus to be received by the power press 16.

As herein shown, the illustrated power press 16 is provided with upper and lower pressure platens 64, 66 respectively and the press is preferably arranged in an inclined position with respect to the horizontally disposed traveling grate in order to facilitate transfer of the mica plate being discharged into operative position between the platens, and also so that upon completion of the compressing operation the plate may slide by gravity off the lower press platen 66 onto a table 68 or other support, as indicated.

The illustrated power press 16 is arranged to be operated by a crank shaft 70 arranged to be rotated by any usual or preferred driving mechanism herein shown as including an electric motor 74 and a train of gears 76. The crank shaft is connected by a link 78 to a press ram 80 movable in guides 82. The upper platen 64 is attached to the lower end of the press ram to be reciprocated therewith to effect the compressing operation.

The driving mechanism for the press may and preferably will include a ½ revolution clutch of any usual or preferred construction, indicated generally at 84 and, as herein shown, provision is made for controlling the press in timed relation to the operation of the traveling grate 12 so that the press platen 64 is caused to descend to perform the compressing operation immediately upon transfer of a mica plate 14 from the furnace to the press, and, after the pressure has been maintained for a predetermined time interval, the press platen is caused to be elevated, whereupon the compressed plate is discharged and a succeeding plate is delivered to the press at the start of another cycle of operation.

As herein shown, the ½ revolution clutch 84 is provided with a pawl 86 arranged to cooperate with two radially projecting lugs or ratchet teeth 88 formed on the driven member of the clutch and spaced 180° apart. The pawl 86 is normally urged into engagement with a tooth 88 by a spring 90 and is arranged to be rocked out of engagement therewith to release the clutch for ½ revolution by a cam 92 fast on the cam shaft 38 and through connections including a cooperating cam roll 94 carried by a bell crank 96 pivotally mounted at 98 in a bracket 100. The bell crank 96 is connected by a link 102 to a second bell crank 104 pivotally mounted at 106 and which is connected by a link 108 to the pawl 86.

In the illustrated embodiment of the invention, the cam 92 is provided with two high spots 91, 93 so that, in operation, the pawl 86 is rocked twice during each cycle of operation of the apparatus, once to lower the press platen 64 to effect compression of the plate, and once to elevate the platen, the cam being designed to provide a substantial interval of time for the pressure to be maintained on the plate before the platen is again elevated. As herein shown, the high spot 91 has just passed by and effected elevation of the press platen and at this time the cam 36 is just about to effect intermittent movement of the traveling grate to transfer a succeeding plate from the furnace into the press.

Provision is also made in the preferred embodiment of the invention for controlling the power press 16 independently of the intermittent movement of the traveling grate, and as herein shown, a manually operated control lever 110 pivotally mounted at 112 is provided. The lever 110 is provided with an arm 114 arranged to embrace the connecting link 108 and to engage a collar 116 fast on the link so that when the lever is rocked counter-clockwise the link 108 is pulled down to rock the clutch pawl 86. A stop pin 115 may also be provided to limit the movement of the lever 110 in a clockwise direction. The lower end of the link is provided with a yieldable connection to permit downward movement of the link independently of the bell crank 104 during manual control of the press. As herein shown, the yieldable connection may comprise a spring 118 interposed between a swivel block 120 carried by the bell crank and a collar 122 fast on the link 108. A second collar 124 fast on the lower end of the link and disposed to engage the underside of the swivel block 120 is provided to effect positive rocking of the pawl 86 when operated by the tripping cam 92. When the manual control is operated, the link may slide through an opening provided therefor in the swivel block as the spring 118 is depressed.

During the transfer of the mica plate from the furnace to the press, the plate passes over the top of the sprocket 24 across a bridge plate 126, over a roller 128 and onto the lower press platen 66, the conveyer coming to rest with the pusher bar 18 having passed over the top of the sprocket and having pushed the plate onto the lower platen so that the plate may slide by gravity into operative position to be compressed. Provision is made for engaging the leading edge of the plate to dispose the same in operative position on the platen and, as herein shown, a stop pin 130 is provided which is movable in the lower platen and is held in its moved position by a friction plug 132. The pin 130 is normally in its raised position to engage and stop an incoming plate and when lowered the upper platen is arranged to engage and depress the stop pin 130 during the compressing operation. Upon elevation of the press platen 64, the compressed plate may slide by gravity off the lower platen while the stop pin is still depressed and immediately thereafter the pin is again raised to stop a succeeding plate by a rocker arm 136 engageable with the lower end of the pin 130. The arm 136 is fast on a shaft 138 and is arranged to be rocked by a connection to the cam lever 42 so arranged as to effect raising of the stop pin after the conveyer has been advanced through approximately one half of its stroke thus providing ample time for the compressed plate to slide out of the press and also returning the stop into operative position prior to the transfer of a succeeding sheet. As herein shown, the shaft 138 is provided with a lever 140 fast thereon and which is connected by a rod 142 to the cam lever 42. The rod 142 is arranged to slide in a swivel block 144 carried by the cam lever and the rod is normally urged to the left by a spring 146 interposed between the block and a collar 148. A second collar 150 fast on the rod is arranged to be engaged by the swivel block 144 to effect raising of the stop pin after the lever 42 has been rocked through substantially one half of its stroke. The lever 140 may be limited in its return movement by a stop pin 152.

After being compressed, successive mica plates 14 may slide by gravity off the press platens and across a suitable bridge plate 154 and over rollers 156 to be received between vertical guide plates 158, 160 attached to the table 68 to form a pile of mica plates, as illustrated. The usual provision, not shown, may be made for adjusting the press platens 64, 66 with relation to each other in order to permit variation of the pressure applied. The press platens 64, 66 may also be water cooled, as indicated in the drawing in order to expedite the cooling of the heated plate while under pressure in accordance with the present method.

From the above description it will be observed that in the operation of the apparatus, the green mica plates are individually placed on the intermittently operated conveyer in spaced relation and are carried through the furnace 10, and, during their progress through the furnace, the preliminarily bonded mica plates become increasingly hotter until the binder becomes fluxed. In practice it has been found that the maximum length of time required to heat an individual plate to flux the binder is approximately three minutes, and, it will be evident that the length of time the plates remain in the furnace may be regulated by the length of the furnace and the rate of movement of the conveyer.

For purposes of the present description if we assume that the intermittent movement of the conveyer discharges one plate every thirty seconds or two a minute it will be seen that the length of the furnace should be such as to hold at least six successive plates to provide a total time of three minutes within the furnace for each individual sheet. In commercial practice, the dimensions of the individual mica plates are approximately one foot wide and three feet long and are preferably extended transversely of the conveyer.

It will be further observed that the heated plate is transferred directly from the furnace to the press by the intermittent movement of the conveyer, the plate being permitted to slide by gravity into operative position to be compressed, and that the pressure is applied immediately while the binder is still in a state of flux, the pressure being maintained until the binder has cooled below its fluxing point. As further illustrative of the operation of the present apparatus, the press 16, operated in timed relation to the intermittently operated conveyer 12 which discharges a plate every thirty seconds, is arranged to maintain compression for approximately twenty seconds maximum thus allowing ten seconds during each cycle of operation for the removal of a compressed plate and the introduction of a heated plate into the press. Thus it will be seen that in the above example of the progress of an individual plate through the apparatus a minimum of 120 mica plates may be produced in one hour. It will be understood that the above figures are merely illustrative and that the heating and pressing times may be varied, and if desired materially reduced in practice so that a much greater production may be obtained. For example, the heating time may vary between one and one half to three minutes and the pressure time may vary between fifteen to thirty seconds without water cooled platens and between ten to twenty seconds with water cooled platens.

The important feature of the present invention may be best appreciated by consideration of the prior methods of producing a comparable bonded mica plate, such methods being illustrated in the above mentioned patent to Boughton and Mansfield. As therein set forth, after the plate has been built up by layering the mica films and has been dehydrated by preliminary heating to remove the solvent from the binder, a pile or stack of the plates is assembled with metal separator sheets between adjacent plates to form a heater charge. This is then placed in an oven and heated to red heat for substantial periods of time to flux the inorganic binder. In practice the charge was heated without the addition of further pressure upon the plates other than that due to the weight of the material forming the charge, until a binder fluxing temperature of red heat was reached, for example about 550° C. to about 650° C. for the inorganic binder specifically described in the patent. The charge, while still red hot with the binder in a molten viscous state, was then drawn into a suitable press and immediately a pressure of from about 250 to about 500 pounds per square inch was applied to the top and bottom of the stack. The entire charge was then permitted to cool, assisted preferably by water cooled platens or by air blasts, while the assembly was still maintained under pressure.

Although the products of the methods described by Boughton and Mansfield have been found, in extensive commercial manufacture, to be very satisfactory and far superior to any such products theretofore available, we have found that during the cooling of the multiple heater charge under compression, there takes place a thermal effect which produces a decrease in compression upon the outer area of the mica plates and thus serves to decrease the mechanical integration of the outer area and the uniformity of the product. This thermal effect is caused, apparently, by differences in thermal coefficients of contraction due to the differences in temperature which then exist between the inner area and the outer area of the multiple heated charge during cooling under compression of the heater charge as a whole.

In practicing the prior method, when the multiple heater charge in its heated state was transferred to a press and compressed, the pressure is believed to be uniformly distributed over the different parts of the individual plates so long as the binder was in a molten viscous state. However, as the multiple charge began to cool under compression, the cooling takes place first at the sides of the charge exposed to the surrounding atmosphere and then progresses gradually toward the center of the charge in a direction from all of the exposed sides. A point is reached where the outer area of the mica plates is cooled to temperatures below the solidification point of the binder, while the binder in the inner area of the mica plates is still in a molten viscous state.

Thus, at this state in the prior process, the outer area nearer the edges of the mica plate was in a contracted state while the inner area nearer the middle is in an expanded state and consequently the applied pressure is being exerted to a far less degree upon the outer contracted area than upon the inner expanded area of the mica plates in the multiple heater charge during the cooling operation. It has been found, in practice, that this difference in compression produces a difference in the degree of fusion and flow of the binder and consequently a difference in the degree of uniformity of the resulting product. Furthermore, the degree of compression upon the outer area of the mica plate, that is, the area which is beyond the molten binder, was found to decrease toward the edges of the mica plate as the distance from the inner area becomes greater. We have found also that the deleterious thermal effect becomes increasingly greater as the thickness of the multiple heater charge or number of mica plates in the assembly, is increased. This is readily explained by the fact that the total thickness of the expanded inner area of the mica plates in the multiple charge is proportionately greater than the total thickness of the contracted outer area of the mica plates, as the number of mica plates in the heater charge is increased. This proportionate differences in degree of compression upon the inner and outer area of the mica plates, with consequently inadequate fusion and irregular flow of the binder in the outer area of the mica plates, decreased mechanical strength and integration, and produced less translucency and uniformity of product.

We have found further that, as the result of the above described thermal effect, a mechanical distortion effect gradually develops in the metal separator sheets at points or areas where the inner expanded and outer contracted areas meet, upon repeated subjection of the plates in the heater charges to red heat and subsequent cooling under compression. This mechanical distortion effect takes the form of knurled spots and bumps in the metal sheets. Thus, in addition to the thermal effect, there is introduced a deleterious mechanical effect, which is directly attributable to and further developed by the thermal effect, and this mechanical effect, added to the thermal effect, serves even further, and progressively more, to create even greater differences in the degree of compression between the inner and outer areas of the mica plates, and thus to produce even greater differences in the relative degrees of fusion and irregularity in flow of the binder in the inner and outer areas of the mica plates and in uniformity of the product.

In accordance with the present invention, the substantially uniform dissipation of heat from all of the different parts of the plate enable the maintenance of uniform compression upon the plate at all points during cooling and produces a uniform product of superior hardness, mechanical integration, translucency, and uniformity.

While the preferred application of the present invention and the preferred form of apparatus for practicing the same have been herein illustrated and described, it will be understood that the invention may be applied to other methods and the apparatus may be embodied in other forms within the scope of the following claims.

Having thus described the invention, what is claimed is:

1. Apparatus of the character described having in combination, a heating furnace provided with means for maintaining the temperature therein in the neighborhood of red heat, a conveyer for moving individual composite bonded mica plates, each comprising an assembly of layers of mica flakes superficially bonded together by an unfluxed inorganic binder successively through the heating furnace in a horizontal plane to bring the binder to a state of flux, a power press disposed immediately adjacent the discharge end of said heating chamber and arranged to receive successive heated plates directly from the furnace, said press being inclined downwardly and rearwardly with relation to the horizontal plane of the plate as it is discharged from the furnace by the conveyer whereby to facilitate movement of the plate into and out of the press, and means for operating said press in timed relation to the movement of said conveyer to effect compression of successive plates while the binder is still in a state of flux and to maintain said pressure for a predetermined interval during which the plate is cooled.

2. Apparatus for producing high-heat composite inorganic-bonded mica plates, comprising; a heating chamber, conveying means for intermittently moving individual mica plates through said heating chamber, means for discharging plates from said conveyor as they emerge from said chamber, a cyclically operable power press arranged to receive immediately plates discharged from said conveyor and to compress said plates, and control means arranged to control operation of said conveyor and power press in timed relation to each other to cause said press to maintain a substantially constant pressure on each mica plate for a substantial portion of each cycle of operation of said apparatus.

3. In a method of producing high-heat composite inorganic-bonded mica plates, the steps of; assembling a composite plate superficially bonded together by an unfluxed inorganic binder, moving successive plates through a heating zone, maintaining the temperature of said zone sufficiently high to cause said binder to assume a state of flux, successively compressing individual plates immediately upon emerging from said heating zone and while the binder is still in a state of flux, and maintaining substantially uniform pressure over the entire face of said plate until it has cooled sufficiently to solidify the binder.

WILLIAM R. MANSFIELD.
FRANK C. HUGHES.

REFERENCES CITED

The following references are of record in the file of this patent:

UNITED STATES PATENTS

| Number | Name | Date |
|---|---|---|
| 1,262,016 | Close | Apr. 9, 1918 |
| 1,738,097 | Cooper | Dec. 3, 1929 |
| 1,945,992 | Boblett et al. | Feb. 6, 1934 |
| 1,993,413 | Mellon | Mar. 5, 1935 |
| 2,005,621 | Habicht | June 18, 1935 |
| 2,035,650 | Gustafson | Mar. 31, 1936 |
| 2,036,129 | Franke | Mar. 31, 1936 |
| 2,231,718 | Hill | Feb. 11, 1941 |
| 2,363,323 | Hill | Nov. 21, 1944 |
| 2,445,742 | Hoch | July 20, 1948 |